US010396584B2

(12) United States Patent
Madau et al.

(10) Patent No.: US 10,396,584 B2
(45) Date of Patent: Aug. 27, 2019

(54) WIRELESS CHARGING STEERING WHEEL (71) Applicants: Dinu Petre Madau, Canton, MI (US); Upton Beall Bowden, Canton, MI (US); Myron Lemecha, Dearborn, MI (US); J. William Whikehart, Milford, MI (US)

(72) Inventors: Dinu Petre Madau, Canton, MI (US); Upton Beall Bowden, Canton, MI (US); Myron Lemecha, Dearborn, MI (US); J. William Whikehart, Milford, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 178 days.

(21) Appl. No.: 15/137,764

(22) Filed: Apr. 25, 2016

(65) Prior Publication Data
US 2017/0310144 A1 Oct. 26, 2017

(51) Int. Cl.
*H02J 7/00* (2006.01)
*H02J 7/14* (2006.01)
*H02J 7/02* (2016.01)
*H05B 1/02* (2006.01)
*B62D 1/06* (2006.01)
*B60R 16/03* (2006.01)
*H02J 50/10* (2016.01)

(52) U.S. Cl.
CPC .............. *H02J 7/025* (2013.01); *B60R 16/03* (2013.01); *B62D 1/065* (2013.01); *H02J 7/0042* (2013.01); *H02J 50/10* (2016.02); *H05B 1/0236* (2013.01)

(58) Field of Classification Search
USPC ....... 320/108, 101, 109, 115, 125, 128, 137, 320/138; 219/204, 618, 635, 600, 636, 219/67; 307/10.1, 9.1, 65
See application file for complete search history.

(56) References Cited

U.S. PATENT DOCUMENTS

| | | | | |
|---|---|---|---|---|
| 2011/0248667 A1* | 10/2011 | Umeoka | ................ | B60K 16/00 320/101 |
| 2012/0000903 A1* | 1/2012 | Baarman | ............... | A47J 27/002 219/620 |
| 2013/0032589 A1* | 2/2013 | Chung | .................... | H02J 7/025 219/618 |
| 2013/0180354 A1* | 7/2013 | Maranville | ............ | B62D 1/065 74/552 |

(Continued)

FOREIGN PATENT DOCUMENTS

CN 202641808 U 1/2013

OTHER PUBLICATIONS

Tilley, Aaron, "Wireless Charging Is Coming to Wearables, Eventually." Forbes Online Magazine, Oct. 2, 2014 at 9:00AM, pp. 1-4, http://www.forbes.com/sites/aarontilley/2014/10/02/drayson-wireless-reemo/.

*Primary Examiner* — Alexis B Pacheco
(74) *Attorney, Agent, or Firm* — Dickinson Wright PLLC (57) ABSTRACT

A wireless charging steering wheel device is described herein. The wireless charging steering wheel device is coupled to a power source via a clockspring included in the steering wheel. Also disclosed herein is an integrated wireless charging/heating system. Also disclosed herein are multiple coil placements for implementing the wireless charging steering wheel device.

18 Claims, 8 Drawing Sheets

(56) References Cited

U.S. PATENT DOCUMENTS

| | | | | |
|---|---|---|---|---|
| 2014/0049221 A1* | 2/2014 | Nishide | ............... | B60R 16/00 320/115 |
| 2014/0111324 A1* | 4/2014 | Lisseman | ............ | B62D 1/046 340/435 |
| 2015/0277559 A1* | 10/2015 | Vescovi | ............... | G06F 3/014 345/173 |
| 2016/0028267 A1* | 1/2016 | Lee | ............... | H02J 50/12 320/108 |
| 2016/0087484 A1* | 3/2016 | Kim | ............... | H02J 7/025 320/101 |
| 2016/0090103 A1* | 3/2016 | Tan | ............... | B60W 50/10 345/156 |
| 2016/0094051 A1* | 3/2016 | Soar | ............... | H04B 5/0031 307/9.1 |
| 2016/0101805 A1* | 4/2016 | Nishio | ............... | B62D 1/065 219/204 |
| 2016/0149434 A1* | 5/2016 | Kim | ............... | H02J 5/005 320/108 |
| 2017/0094727 A1* | 3/2017 | Saunamaki | ............ | H05B 6/10 |

\* cited by examiner

WIRELESS CHARGING STEERING WHEEL

BACKGROUND

Wearable technology devices (or just wearable devices) are becoming more common. Wearable technology devices are electronic devices communicable (for example, wirelessly) to other electronic devices. Several examples of wearable technology devices are a smart watch, electronic rings, electronic bracelets, and the like.

These devices are equipped with wireless communication capabilities, and as such, may communicate with other electronic systems. Often times, the wearable technology device is coupled to a biometric function, and may detect an aspect of the wearer's physiology.

In other cases, the wearable technology device may be an information providing device, and be coupled to a network connection (e.g. a cloud storage device, satellite connection, wireless internet, short range communication protocol, or the like), and communicate the information to the wearer of the wearable technology device.

Wearable devices, such as those described above, require electric power to operate. Thus, when the user charges the wearable device, the wearable device is often removed from the user's person, and placed in a charging state. Conventionally, charging has been performed through employing a wire to couple the wearable device to a power source, such as a wall outlet or a battery.

In recent years, wireless charging (or inductive charging, Qi charging, non-contact charging) has become more popular. Inductive charging allows a power source to be electrically coupled to a receiving device without the use of wires and connectors.

The inductive charging systems employ a coil on the transmission side (TX) and a coil on the reception side (RX). As electric current is driven through the TX side, the electric current turns into magnetic energy, which resonates on the coils in the RX side. Thus, energy is transferred from a source to a receiver.

Figure 1:
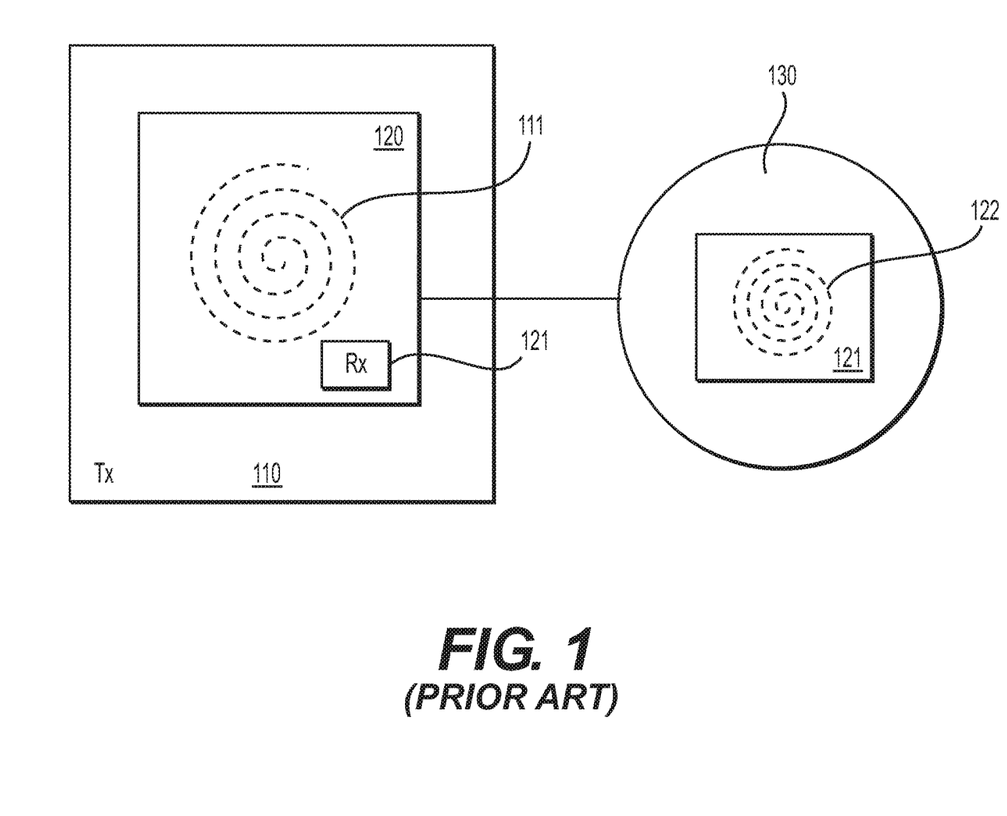
FIG. 1 illustrates an example of a wireless charging device according to a prior art implementation.

FIG. 1 illustrates an example of an inductive charging system 100 according to a prior art implementation. As shown in FIG. 1, the inductive charging system 100 includes a TX device 110 and an RX device 121. The TX device 110 is coupled to a power source, such as a battery or the like. The TX device 110 is configured to electrically couple the battery/charger to a mobile device (or device) 120, independent of wires or any sort of mechanical fastening or coupling.

The device 120 being powered may have an embedded RX device 121. As shown in FIG. 1, the TX device 110 includes a transmitting coil 111 that is configured to deliver power to a receiving coil 122 (as shown in blown-up view 130).

However, in either the wired solution discussed above, or the wireless systems recently proposed, a user is burdened by removing their wearable device to enter into a charging state. In the case of wired charging, the user has to remove their device and couple the device to a wire. In the case of wireless charging, the user has to remove their device and place the device onto a wireless charging pad.

In either situation, the user is left not being able to use or enjoy their wearable device. Thus, all functions associated with the wearable device (i.e. biometric sensing, message receiving, and the like) are ultimately frustrated.

SUMMARY

The following description relates to system, methods, and circuit devices related to providing a wireless steering wheel charger. Exemplary embodiments may also be directed to any of the system, the method, and wireless steering wheel charging device related to the same.

Additional features of the invention will be set forth in the description which follows, and in part will be apparent from the description, or may be learned by practice of the invention.

A wireless charging steering wheel is disclosed herein. The wireless charging steering wheel includes a center portion pivot-able and attached to a vehicle; a connection portion coupled to the center portion; a handle portion that circumscribes the center portion, and is connected to the connecting portion; a clockspring installed in the center portion, the clockspring electrically connecting an electronic component unit (ECU) of the vehicle with actuators installed on the steering wheel; an upholstery layer covering the center portion, the connection portion, and the handle portion; at least one coil wrapped around the handle portion and coupled to the clockspring, and covered by the upholstery layer, wherein the coil is electrically charged to provide wireless charge to a wearable device worn by a driver of the vehicle in a proximity of the steering wheel.

In another example, the coil is wrapped around the handle portion.

In another example, the wireless charging steering wheel has multiple coils wrapped around the handle portion, and the multiple coils are placed at a predetermined distance from each other.

In another example, the coil is wrapped circumferentially around the steering wheel.

In another example, the wireless charging steering wheel is further coupled to a processor configured to determine whether the coil is in a heating mode, a wireless charging mode, both the heating mode and the wireless charging mode, or neither the heating mode and the wireless charging mode.

In another example, the coils are further configured to electrically and wirelessly communicate data to and from the wearable device.

Also provided herein is a system for implementing a wireless charging steering wheel. The system includes a processor configured to receive an indication of an assertion of one of the following modes: a wireless charging mode, and a heating mode; the processor being electrically coupled to a power source and at least one coil in a handle portion of the wireless charging steering wheel, wherein in response to the processor receiving the indication, the processor drives the at least one coil with a predetermined electricity corresponding to one of the above-listed modes.

It is to be understood that both the foregoing general description and the following detailed description are exemplary and explanatory and are intended to provide further explanation of the invention as claimed. Other features and aspects will be apparent from the following detailed description, the drawings, and the claims.

DESCRIPTION OF THE DRAWINGS

The detailed description refers to the following drawings, in which like numerals refer to like items, and in which.

DETAILED DESCRIPTION

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

Wearable devices worn on a person's body often need to be periodically charged. As explained in the Background section, the periods of charging often involve a user removing the wearable device from a worn state and into a charging state.

As such, the efficacy of wearable devices is lessened. In certain cases, a user may require the wearable device to count a metric (like steps). Thus, while the wearable device is being charged, the user is no longer able to perform the activity of counting steps. Further, the user may require the wearable device to receiving and send messages. Once again, while the wearable device is charging, the user is no longer capable of performing said activity.

Thus, incorporating charging into a person's daily routine may obviate the above-noted problem. Disclosed herein is wireless steering wheel charging device. The wireless steering wheel charging device may allow a wearer of the wearable device to charge the device while driving.

Also disclosed herein are methods and systems for implementing the wireless charging device in a vehicle. Thus, existing steering wheels, the circuitry included with the steering wheels, may be modified employing the concepts disclosed herein.

Figure 2:
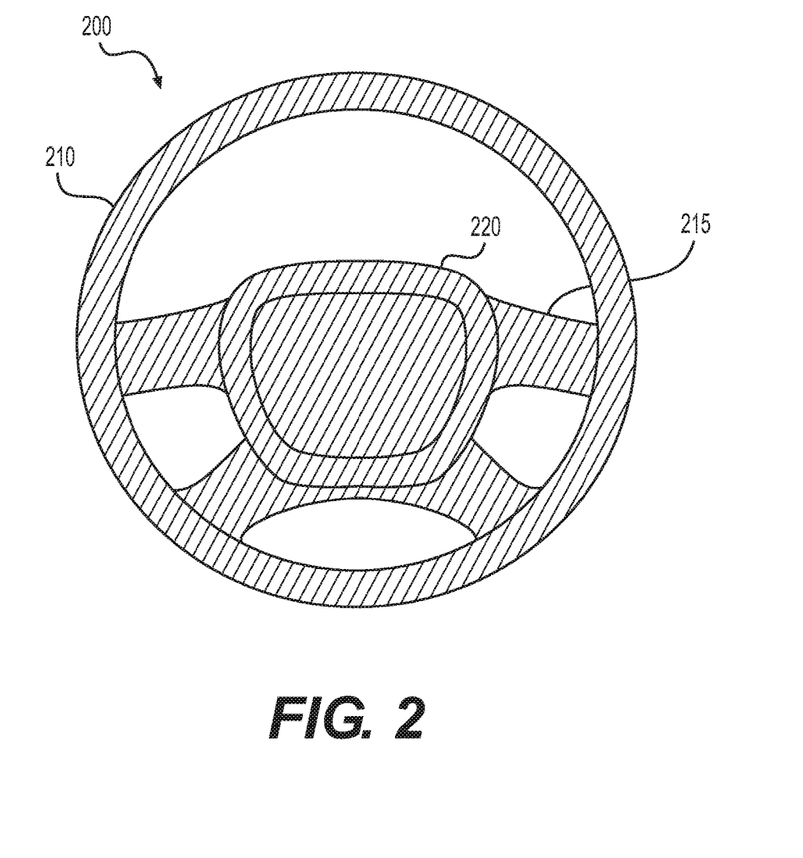
FIG. 2 illustrates a front-view of a steering wheel according to an exemplary embodiment.

FIG. 2 illustrates a front-view of a steering wheel 200 according to an exemplary embodiment. The modifications to the steering wheel 200 shown that embody the aspects disclosed herein will be described an illustrated with further detail below.

The steering wheel 200 shown includes a handle portion 210, a center portion 220, and a connecting portion 215. The steering wheel 200 shown is merely exemplary, with one of ordinary skill in the art being appreciative that many other designs of a steering wheel may be implemented. The shape of a handle portion 210 of a steering wheel 200 is well known in the art, and thus, a detailed explanation will be omitted.

The center portion 220 is connected to the vehicle (at the back of the center portion 220 not shown). The center portion 220 is configured to be pivotable, with the movement of the steering wheel 200 being translated into the movement of the vehicle's axels. Once again, the operation of a steering wheel 200 is well known, and thus, a detailed explanation will be omitted.

In operation, a driver will grab onto the handle portion 210 to operate the vehicle. Thus, for a significant portion of the driver's operation of the vehicle, the driver's hands are in the periphery of the steering wheel 200's handle portion 210.

The steering wheel 200 shown, and its related components, are each upholstered with a variety of materials, including, but not limited to leather, synthetic leather, a plastic, or some combination thereof. As will be described further down, the upholstery covers internal wiring and circuitry described herein.

Figure 3:
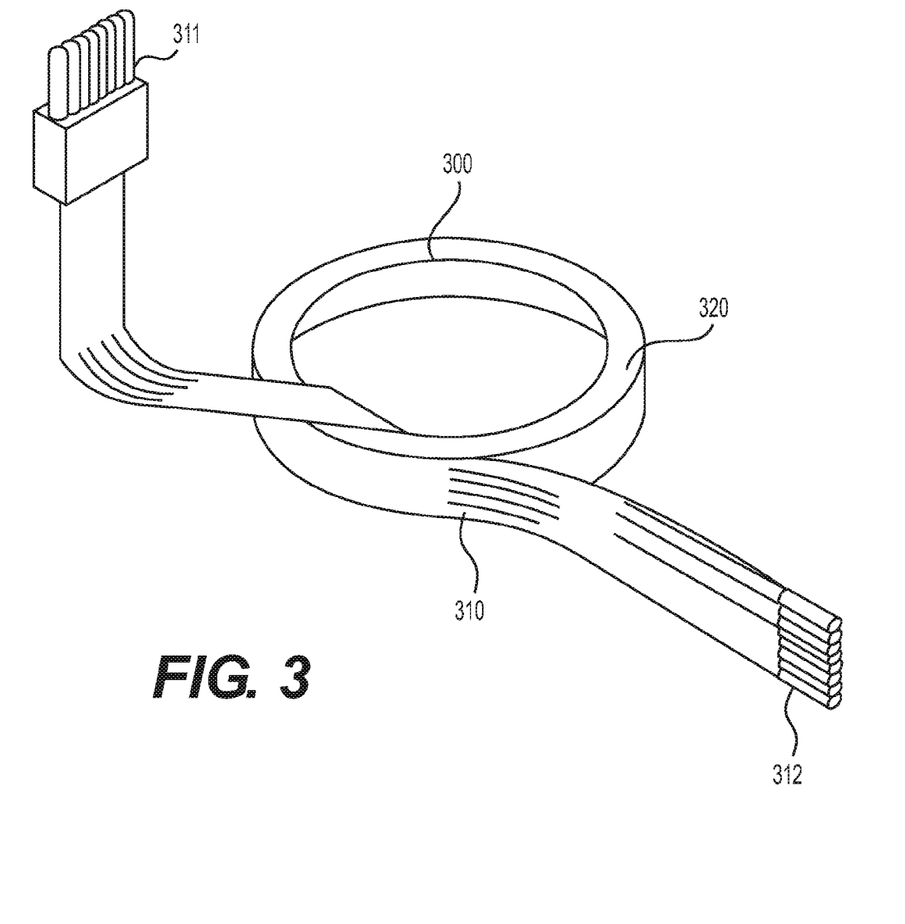
FIG. 3 illustrates an example of a clockspring according to an exemplary embodiment disclosed herein.

In the center portion 220, and not shown in FIG. 2, is a clockspring 300. FIG. 3 illustrates an example of a clockspring 300 according to an exemplary embodiment disclosed herein. The clockspring 300 includes electrical conducting wires 310 rolled around a spool 320. The spool 320 is cylindrical and designed to fit in the center portion 220, and covered by the upholstery described above.

One end 311 of the electrical conducting wires is configured to connect and be coupled to a variety of electronic systems associated with the vehicle. For example, the vehicle may have a standard electrical control unit (ECU). The ECU is a processor that interfaces with a variety of sub-components in a vehicle. In this way, the steering wheel 200 may be provided with a host of buttons and actuators capable of being asserted by the driver. Once one of the commands are activated, a signal is sent from a second end 312 of the clockspring 300 (through one of the wires 310 dedicated to coupling the button to the requisite control port), and as such, the vehicle may be configured to instigate an action based on the asserted command.

In a steering wheel 200 implementation, many different permutations and combinations may be realized with interfaces. For example, radio control, climate control, power steering, windshield wipers, turn signals, and the like may all be controlled employing a combination of buttons/actuators and the like coupled to the ECU, via the clockspring 300.

Figure 4A:
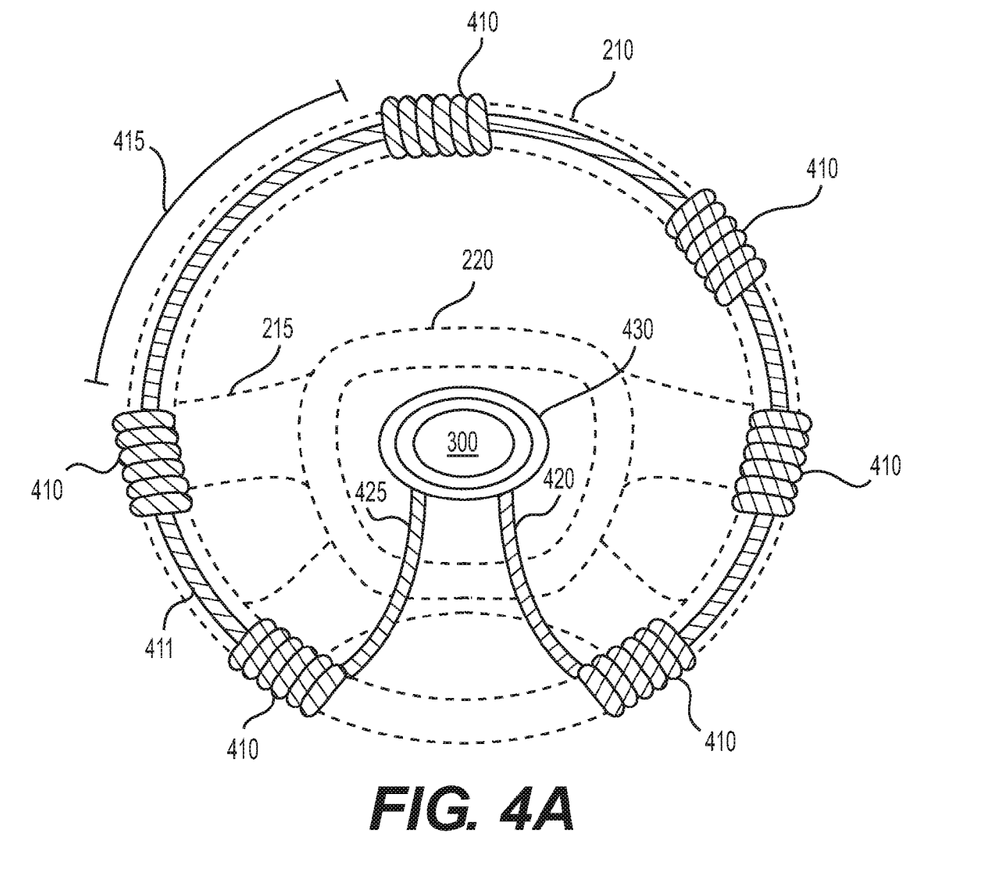
FIGS. 4(a) and (b) illustrate a front-view and a side-view, respectively, of the steering wheel implementing a first embodiment of the steering wheel charging device disclosed herein.
Figure 4B:
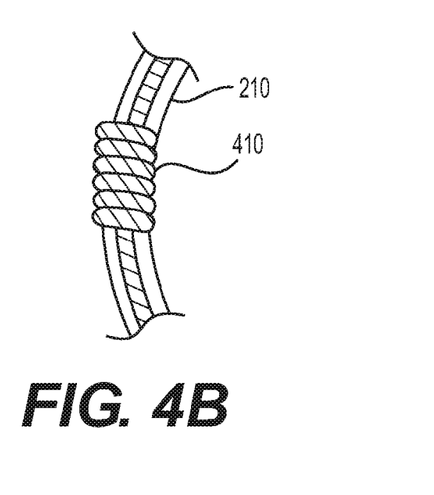

FIGS. 4(a) and (b) illustrate a front-view and a side-view, respectively, of the steering wheel 200 implementing a first embodiment of the steering wheel charging device 400 disclosed herein. As shown in FIGS. 4(a) and (b), the upholstery has been removed to illustrate the concepts disclosed herein.

As shown, the handle portion 210 includes coils 410 wrapped around the handle portion 210. The coils 410 each include a predetermined spacing 415 in between each coil 410. Further, coils 410 are all coupled to each other serially with wires 411, and coupled to the coil spring 300 via two wires, 420 and 425 run through the connecting portion 215. Two wires are used to connect a power in (source node) and a power out (i.e. ground node) to complete the circuit.

The wires 430 are added to the coil spring 300's wires 310, and run through to be coupled to a power/ground nodes associated with the vehicle, ans specifically to the vehicle's provision of power to the wireless charger. Alternatively, the wire may be coupled to any sort of smart charging processor or control circuit not described herein.

The coils 410 are each wrapped around the handle portion 210 as shown. Thus, as explained in the Background section, as the coils 410 are electrically coupled to a power source and ground, the coils 410 each provide inductive energy that is capable of being wirelessly propagated to an RX device.

Thus, if the wearer of the wearable device places their arms/hands in a standard driving stance, the wearable device is charged if provided with an RX device 121 capable of receiving wireless charging.

Figure 5A:
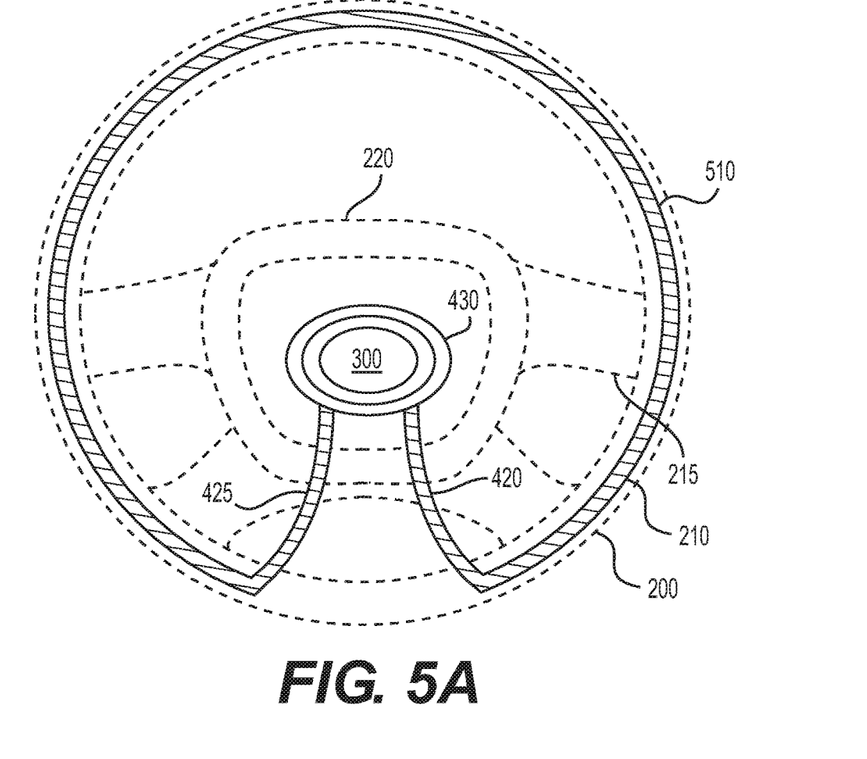
FIGS. 5(a) and (b) illustrate a front-view and side-view, respectively, of the steering wheel implementing a second embodiment of the steering wheel charging device disclosed herein.
Figure 5B:
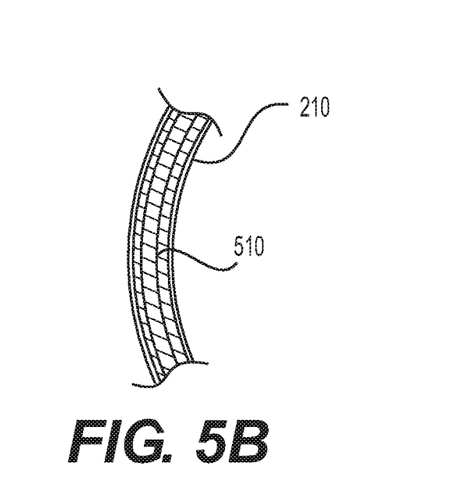

FIGS. 5(a) and (b) illustrate a front-view and side-view, respectively, of the steering wheel 200 implementing a second embodiment of the steering wheel charging device 500 disclosed herein.

In contrast to the steering wheel charging device 400, the coils 510 are now wrapped around the handle portion 210 circumferentially to the steering wheel 200 as shown. The coils 510 are still coupled to the ECU via similar wires shown in FIG. 4.

Figure 6:
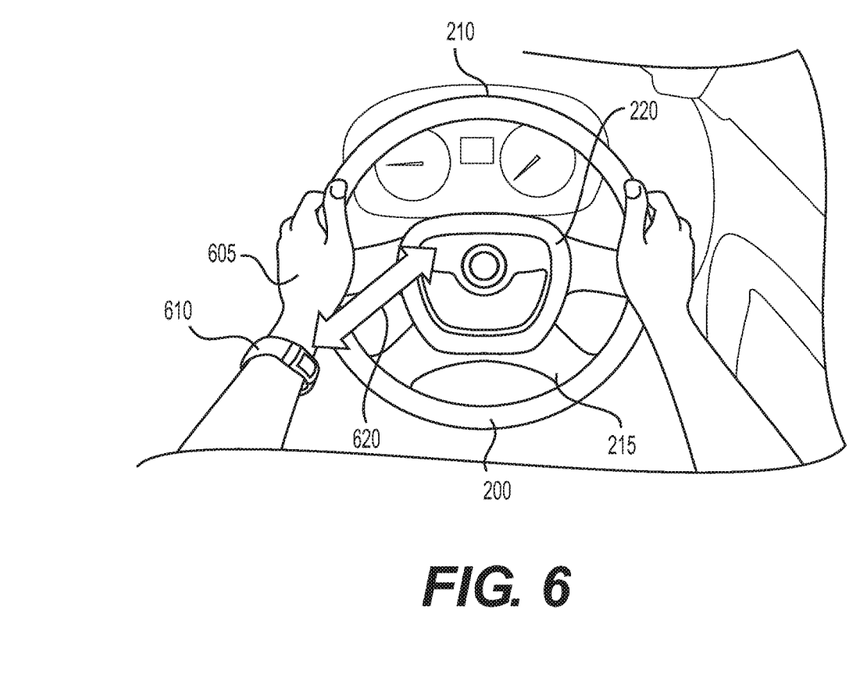
FIG. 6 illustrates an example of a vehicle implementing the aspects disclosed herein.

FIG. 6 illustrates an example of a vehicle 600 implementing the aspects disclosed herein. As shown, the driver is wearing a wearable device 610 on a wrist 605. Employing the concepts disclosed herein, the wearable device 610 is electrically coupled to at least one of the coils (for example coils 410 or 510), and electrically charged as shown by arrow 620.

In another example of the implementation shown above, similar to charging, the steering wheel 200 may be implemented with wires and circuits configured to provide short-range wireless communication to/from the wearable device 610. As such, when the driver places a wrist 605, the signals being propagated to and from the steering wheel device 200 may be information uploaded/downloaded from each RX or TX device.

Figure 7:
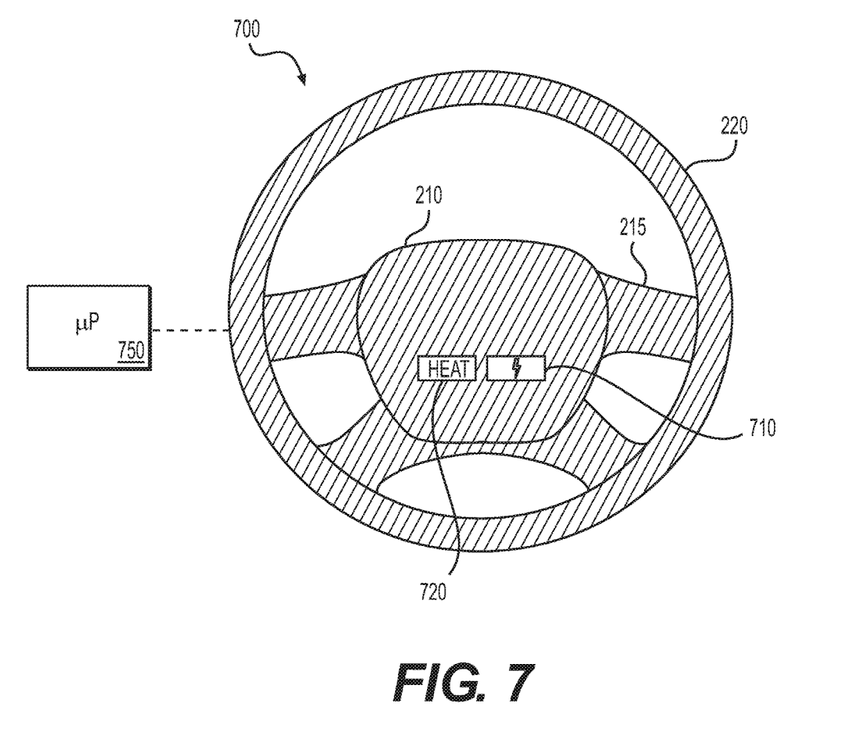
FIG. 7 illustrates another implementation of a steering wheel implementing a heating component.

FIG. 7 illustrates another implementation of a steering wheel 700 implementing a heating component.

The steering wheel 700 includes a button 710 to activate charging, a button to activate heating 720. The buttons are shown on the center portion 720; however, an implementer may place the buttons in other locations in the vehicle, or even a secondary device used to control functions in the vehicle (for example, a mobile device paired with the vehicle).

In steering wheel 700, the coils (for example, coils 410 or 510) may be controlled to provide heating. As the coils 410 or 510 are driven with a sufficient amount of electrical energy, the coils heat up. As such, when driven with the predetermined amount of the energy, the coils 410 and 510 are configured to provide a heating option.

Thus, a system may be provided that detects whether the user wants to have wireless charging, heating, or both based on the assertion of buttons 710 and 720, and employ either of the configurations shown in FIGS. 4 and 5 to provide the requisite function associated with charging the coils. As such, a wireless charging device for a steering wheel 700 may also be configured to provide a heating function as well.

The steering wheel 700 may be coupled to a processor/system 750 programmed with instructions to operate the steering wheel 700 in the manner described above.

Figure 8:
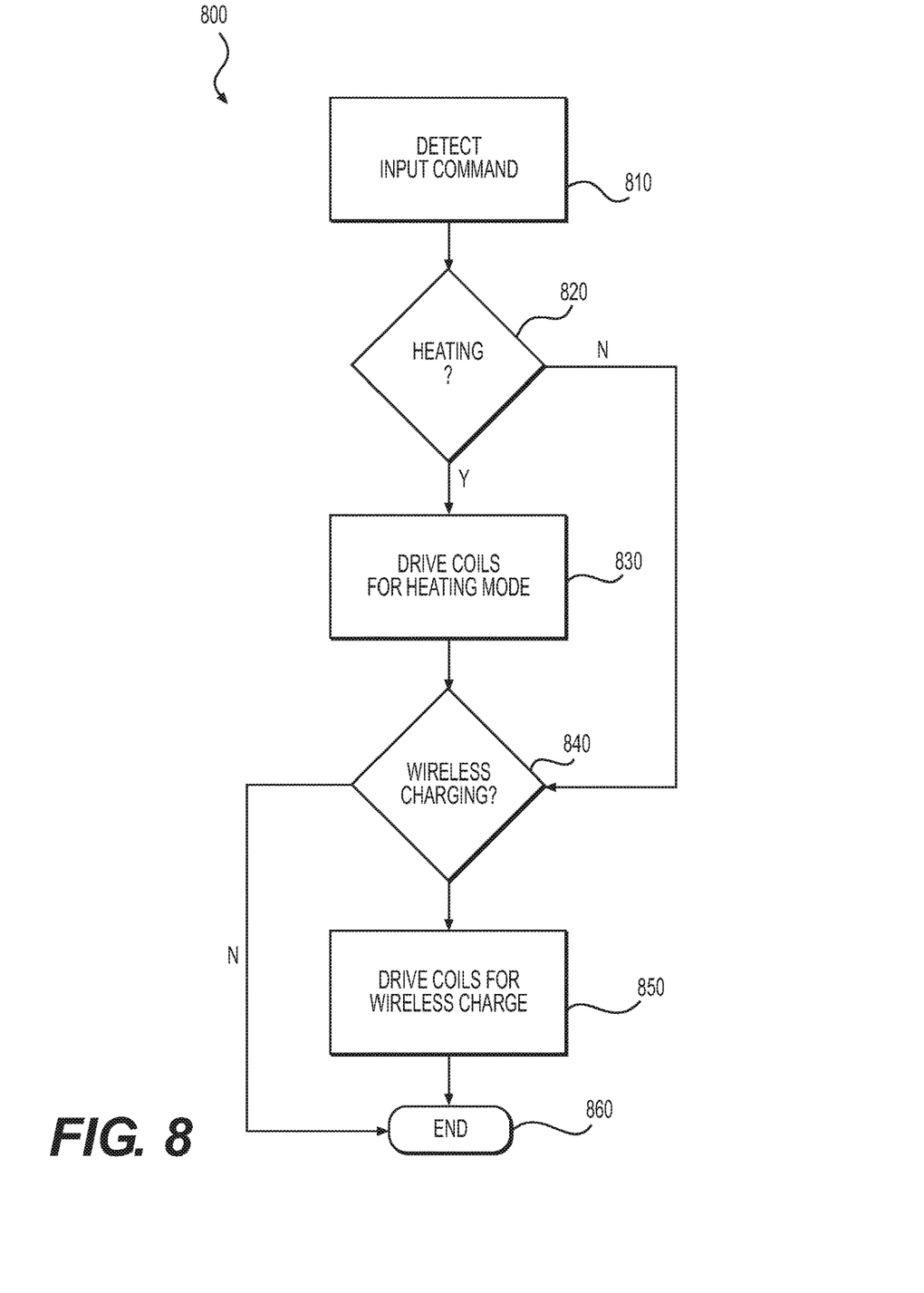
FIG. 8 illustrates a method describing an operation of the system employing the aspects discussed in FIG. 7.

FIG. 8 illustrates a method 800 describing an operation of a system 750 employing the aspects discussed above. In operation 810, the input of either or both the heating and wireless charging modes are detected (i.e., employing an implementation as shown in FIG. 7).

In response to heating being selected (as determined in operation 820), the coils are driven to provide heating via the steering wheel 700. Thus, by being driven, electricity at a predetermined amount requisite to heat the coils is propagated through the coils (in operation 830).

Alternatively, if the answer to the determination in operation 820 is no, the method 800 proceeds to operation 840, and a second determination is made as to whether the steering wheel 700 is in a wireless charging mode. Alternatively, this determination may be made subsequent to operation 830 as well.

As such, if the answer to the determination 840 is no, the method 800 proceeds to operation 860 (thereby ending method 800). However, if the answer is yes, in operation 850, the system 750 is configured to drive the coils to provide at least wireless charging capabilities and/or both.

Thus, employing the aspects disclosed herein, a driver of a vehicle is seamlessly provided wireless charging functions while wearing a wearable device capable of receiving wireless charging.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

We claim:

1. A wireless charging steering wheel, comprising:
a center portion pivot-able and attached to a vehicle;
a connection portion coupled to the center portion;
a handle portion that circumscribes the center portion, and is connected to the connecting portion;
a clockspring installed in the center portion, the clockspring electrically connecting an electronic component unit (ECU) of the vehicle with actuators installed on the steering wheel;
an upholstery layer covering the center portion, the connection portion, and the handle portion;
at least one coil wrapped around the handle portion and coupled to the clockspring, and covered by the upholstery layer, wherein the coil is electrically charged to provide wireless charge to a wearable device worn by a driver of the vehicle in a proximity of the steering wheel; and
a processor configured to control whether the coil is in a heating mode, a wireless charging mode, both the heating mode and the wireless charging mode, or neither the heating mode nor the wireless charging mode.

2. The wireless charging steering wheel according to claim 1, wherein the coil is wrapped around the handle portion.

3. The wireless charging steering wheel according to claim 2, further comprising multiple coils wrapped around the handle portion, and the multiple coils are placed at a predetermined distance from each other.

4. The wireless charging steering wheel according to claim 1, wherein the coil is wrapped circumferentially around the steering wheel.

5. The wireless charging steering wheel according to claim 1, further coupled to a processor configured to determine whether the coil is in a heating mode, a wireless charging mode, both the heating mode and the wireless charging mode, or neither the heating mode and the wireless charging mode.

6. The wireless charging steering wheel according to claim 1, wherein the coils are further configured to electrically and wirelessly communicate data to and from the wearable device.

7. A method for a wireless charging steering wheel, the method comprising:
controlling, by a processor, a mode of a coil of the wireless charging steering wheel, the wireless charging steering wheel comprising a center portion pivot-able and attached to a vehicle, a connection portion coupled to the center portion, a handle portion that circumscribes the center portion, and is connected to the connecting portion, a clockspring installed in the center portion, the clockspring electrically connecting an electronic component unit (ECU) of the vehicle with actuators installed on the steering wheel, an upholstery layer covering the center portion, the connection portion, and the handle portion, at least one coil wrapped around the handle portion and coupled to the clockspring, and covered by the upholstery layer;
electrically charging the coil to provide wireless charge to a wearable device worn by a driver of the vehicle in a proximity of the steering wheel,
switching, by the processor, the mode of the coil from among a heating mode, a wireless charging mode, both the heating mode and the wireless charging mode, or neither the heating mode nor the wireless charging mode.

8. The method of claim 7, wherein the coil is wrapped around the handle portion.

9. The method of claim 7, wherein the wireless charging steering wheel further comprises multiple coils wrapped around the handle portion, and the multiple coils are placed at a predetermined distance from each other.

10. The method of claim 7, wherein the coil is wrapped circumferentially around the steering wheel.

11. The method of claim 7, further comprising:
wirelessly communicating data to and from the wearable device using the coil.

12. The method of claim 7, further comprising:
electrically communicating data to and from the wearable device using the coil.

13. A wireless charging steering wheel, comprising:
a center portion pivot-able and attached to a vehicle;
a connection portion coupled to the center portion;
a handle portion that circumscribes the center portion, and is connected to the connecting portion;
a conductor installed in the center portion, the conductor electrically connecting an electronic component unit (ECU) of the vehicle with actuators installed on the steering wheel;
an upholstery layer covering the center portion, the connection portion, and the handle portion;
at least one coil wrapped around the handle portion and coupled to the conductor, and covered by the upholstery layer, wherein the coil is electrically charged to provide wireless charge to a wearable device in the vehicle in a proximity of the steering wheel; and
a processor configured to control whether the coil is in a heating mode, a wireless charging mode, or both the heating mode and the wireless charging mode, wherein the heating mode is configured to heat the steering wheel.

14. The wireless charging steering wheel according to claim 13, wherein the coil is wrapped around the handle portion.

15. The wireless charging steering wheel according to claim 14, further comprising multiple coils wrapped around the handle portion, and the multiple coils are placed at a predetermined distance from each other.

16. The wireless charging steering wheel according to claim 13, wherein the coil is wrapped circumferentially around the steering wheel.

17. The wireless charging steering wheel according to claim 13, further coupled to a processor configured to determine whether the coil is in a heating mode, a wireless charging mode, both the heating mode and the wireless charging mode, or neither the heating mode and the wireless charging mode.

18. The wireless charging steering wheel according to claim 13, wherein the coils are further configured to electrically and wirelessly communicate data to and from the wearable device.

* * * * *